Patented Aug. 18, 1936

2,051,536

UNITED STATES PATENT OFFICE 2,051,536

CELLULOSE ORGANIC ESTER COMPOSITIONS CONTAINING PHENYL CYCLOHEXANE

Henry B. Smith, Rochester, N. Y., assignor to Eastman Kodak Company, Rochester, N. Y., a corporation of New York No Drawing. Application November 1, 1935,
Serial No. 47,908

6 Claims. (Cl. 106—40)

This invention relates to compositions of matter in which cellulose organic acid esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, film, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having the desirable properties of celluloid. Other objects will become apparent to those skilled in the art to which this invention pertains.

While cellulose acetate has been known for decades, it has also been known that to utilize it in the various plastic arts it is necessary to mix therewith various plasticizing or conditioning agents. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like.

While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not compatible or at least not sufficiently compatible with cellulose acetate to be used as plasticizers in cellulose acetate compositions.

I have discovered that valuable properties may be induced in and/or contributed to compositions containing organic acid esters of cellulose, such as cellulose acetate, by adding thereto, as a plasticizing compound, phenyl cyclohexane. The particularly useful properties which this compound induces in or contributes to cellulosic compositions containing it are hereinafter enumerated.

In order that those skilled in this art may better understand my invention I would state, by way of illustration, that for the manufacture of photographic film base or other sheets my new compositions of matter may be compounded as follows: 100 parts of acetone-soluble cellulose acetate, i. e., cellulose acetate containing from about 36% to 42% acetyl radical, approximately, is dissolved with stirring at atmospheric temperature in 300 to 500 parts, preferably 400 parts, by weight, of acetone. To this solution may be added from 5 to 30 parts by weight of phenyl cyclohexane. Within the limits stated, the amount of plasticizer may be decreased or increased, depending upon whether it is desired to decrease or increase, respectively, the properties which this plasticizer contributes to the finished product. The amount of solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with my invention are very tough and flexible. For instance, films of cellulose acetate plasticized with from 15% to 30% of phenyl cyclohexane (15 to 30 parts by weight per 100 parts by weight of cellulose acetate) had an initial flexibility from 65% to 135% greater than that of film containing no plasticizer. Furthermore, film so plasticized maintains flexibility in a superior fashion. For instance, at 65° C., films containing from 15% to 30% of phenyl cyclohexane maintained flexibility for 188 days, whereas an unplasticized film became brittle in 30 days. This indicates that films or sheets so plasticized will withstand ordinary usage satisfactorily for many years.

Other similar solvents (instead of acetone) which are compatible with the cellulose acetate and my new plasticizer will also occur to those skilled in this art, such as ethylene chloride-alcohol mixtures. In like manner this plasticizer may be compounded with other single organic acid esters of cellulose, such as cellulose propionate, butyrate, stearate and the like, or with mixed organic acid esters, such as cellulose aceto-stearate, cellulose aceto-propionate, cellulose aceto-butyrate, cellulose aceto-lactate, cellulose aceto-tartrate or the like, a suitable solvent which will dissolve both the cellulosic derivative and the plasticizer being employed, such, for instance, as an alkylene chloride with or without the addition of alcohol.

Inasmuch as my above-described compositions of matter are useful in the production of films and sheets, it will be apparent that my new plasticizer may also be employed with advantage in the other branches of the plastic art. For instance, my novel plasticizer may be employed in connection with a number of the known lacquer and varnish formulae with which it may be found to be compatible. In such cases the plasticizer is usually first put into solution in the cellulose derivative solution, and if non-solvents are added for the purpose of cheapening the composition they are added only to such an extent as will not precipitate the derivative from solution. Other uses within the scope of my invention will also suggest themselves to those skilled in the art and are to be included within the scope of the claims appended hereto.

Phenyl cyclohexane may also be advantageously used as a plasticizer in cellulose organic acid ester molding compositions. For instance, when about 30% (30 parts by weight per 100 parts of cellulose acetate) of phenyl cyclohexane is homogeneously mixed with cellulose acetate, the mixture may be converted into a hard, translucent or transparent plastic product by molding at a temperature of 140-160° C. and a pressure of 2,500 to 4,000 pounds per square inch for a period of from 2 to 5 minutes, in a manner already known to those skilled in molding compounds of that nature.

What I claim as my invention and desire to be secured by Letters Patent of the United States is:

1. A composition of matter comprising a cellulose organic acid ester and phenyl cyclohexane.
2. A composition of matter comprising cellulose acetate and phenyl cyclohexane.
3. A transparent, flexible sheet comprising 100 parts of a cellulose organic acid ester and, as a plasticizer therefor, about 5 to 30 parts, by weight, of phenyl cyclohexane.
4. A transparent, flexible sheet comprising 100 parts of cellulose acetate and, as a plasticizer therefor, about 5 to 30 parts, by weight, of phenyl cyclohexane.
5. A molding composition adapted for molding under elevated temperatures and high pressures, comprising a cellulose organic acid ester and phenyl cyclohexane.
6. A molding composition adapted for molding under elevated temperatures and high pressures, comprising cellulose acetate and phenyl cyclohexane.

HENRY B. SMITH.